(12) United States Patent
Suman

(10) Patent No.: US 9,626,596 B1
(45) Date of Patent: Apr. 18, 2017

(54) IMAGE VARIATION ENGINE

(71) Applicant: Bank of America Corporation, Charlotte, NC (US)

(72) Inventor: Shakti Suman, Muzaffarpur (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 14/987,478

(22) Filed: Jan. 4, 2016

(51) Int. Cl.
*G06K 9/00* (2006.01)
*G06K 9/62* (2006.01)

(52) U.S. Cl.
CPC ......... *G06K 9/6215* (2013.01); *G06K 9/6212* (2013.01)

(58) Field of Classification Search
CPC G06K 9/00; G06K 9/186; G06K 9/62; G06K 9/6202; G06K 9/96203; G06K 9/6212; G06K 9/6215; G06K 9/64; G06K 9/68; G06T 3/40; G06T 7/00
See application file for complete search history.

(56) References Cited

U.S. PATENT DOCUMENTS

| | | | |
|---|---|---|---|
| 5,890,141 A | 3/1999 | Carney et al. | |
| 6,961,463 B1 * | 11/2005 | Loui | G06T 7/20 382/170 |
| 7,031,501 B2 * | 4/2006 | Adachi | G06K 9/6203 382/124 |
| 7,512,275 B2 * | 3/2009 | Yumoto | G06K 9/00087 382/224 |
| 8,600,789 B1 | 12/2013 | Frew et al. | |
| 8,639,017 B1 | 1/2014 | Anderson | |
| 8,712,143 B2 | 4/2014 | Tran | |
| 8,793,191 B2 | 7/2014 | Abernethy et al. | |
| 8,864,029 B2 | 10/2014 | McGlamery et al. | |
| 9,098,765 B2 | 8/2015 | Sandoz et al. | |
| 2015/0186751 A1 * | 7/2015 | Mosier | G06K 9/4642 382/165 |

OTHER PUBLICATIONS

ImageHash 0.3, Python, https://pypi.python.org/pypi/ImageHash/ 0.3 (last visited Dec. 8, 2015).

* cited by examiner

*Primary Examiner* — Jose Couso
(74) *Attorney, Agent, or Firm* — Banner & Witcoff, Ltd.; Michael A. Springs

(57) ABSTRACT

Various features described herein may include ways of processing multiple images to determine whether any duplicates are among the multiple images. A hashing algorithm may be used to create a hash key of an image. Multiple hash keys corresponding to multiple images may be compared to determine whether those images are duplicate images. A root mean square algorithm may be used to further identify whether multiple images are duplicate images. An image variation engine, which uses intensity coding, may be used to display differences between images. For example, similar areas in images may be drawn with low intensity or high opacity, while different areas in images may be drawn with high intensity or low opacity.

20 Claims, 14 Drawing Sheets

IMAGE VARIATION ENGINE

BACKGROUND

Businesses, organizations, and consumers increasingly deal with vast amounts of digital information. Cloud storage solutions allow for storage of digital documents, photographs, and other information. Some companies or individuals have paper documents, photographs, or other non-digital items that they wish to convert to digital format for processing, long term storage, sharing, quick access, or other reasons. To make the digital conversion process easier and more efficient, there will always be a need for an increasingly easy and convenient way to detect duplicates of images.

SUMMARY

The following summary is for illustrative purposes only, and is not intended to limit or constrain the detailed description.

Aspects of the disclosure provide effective, efficient, scalable, and convenient technical solutions that address and overcome the technical problems associated with processing and storing images, including detecting duplicate images.

In accordance with one or more embodiments, a computing device having at least one processor, memory, and a communication interface may receive a first image and a second image, determine whether a size of the first image is different from a size of the second image, if the size of the first image is different from the size of the second image: identify a best fit size, based on the size of the first image and the size of the second image, resize the first image to the best fit size, and resize the second image to the best fit size, generate an image frame, and for each pixel of the first image and each pixel of the second image in a corresponding location as the pixel of the first image: compare the pixel of the first image with the pixel of the second image to determine if the pixel of the first image is the same as the pixel of the second image, in a case that the pixel of the first image is the same as the pixel of the second image, draw a pixel in the corresponding location on the image frame with low intensity, and in a case that the pixel of the first image is not the same as the pixel of the second image, draw the pixel in the corresponding location on the image frame with high intensity.

In some embodiments, the best fit size may be a minimized size that is equal to or smaller in size to the size of the first image and the size of the second image. In some embodiments, identifying the best fit size may include: determining distortion of the first image after resizing, determining distortion of the second image after resizing, and identifying the best fit size based on minimizing the distortion of the first image after resizing and minimizing the distortion of the second image after resizing. In some embodiments, identifying the best fit size may include: determining skewness of the first image after resizing, determining skewness of the second image after resizing, and identifying the best fit size based on minimizing the skewness of the first image after resizing and minimizing the skewness of the second image after resizing. In some embodiments, resizing the first image to the best fit size may include resizing the first image using an anti-aliasing bias. Some embodiments may include the computing device determining that the first image has a first orientation, determining that the second image has a second orientation different from the first orientation, and altering one of the first image and the second image to have a same orientation.

In some embodiments, the computing device may determine the high intensity based on a complement of the low intensity, wherein drawing the pixel in the corresponding location on the image frame with the high intensity includes drawing the pixel in the corresponding location on the image frame with the high intensity based on the complement of the low intensity.

In some embodiments, drawing the pixel in the corresponding location on the image frame with low intensity may include: altering the pixel of the first image to have low intensity, and drawing the pixel in the corresponding location on the image frame with low intensity using the altered pixel. In some embodiments, drawing the pixel in the corresponding location on the image frame with high intensity includes: determining the high intensity based on a complement of the low intensity, altering the pixel of the first image to have the high intensity based on the complement of the low intensity, and drawing the pixel in the corresponding location on the image frame with the high intensity using the altered pixel. In some embodiments, the computing device may, after drawing each altered pixel of the first image on the image frame: for each pixel of the second image and each pixel of the first image in a corresponding location as the pixel of the second image: compare the pixel of the second image with the pixel of the first image to determine if the pixel of the second image is the same as the pixel of the first image, in a case that the pixel of the second image is the same as the pixel of the first image, draw a second pixel in the corresponding location on the image frame with low intensity, and in a case that the pixel of the second image is not the same as the pixel of the first image, draw the second pixel in the corresponding location on the image frame with high intensity. In some embodiments, drawing the second pixel in the corresponding location may include combining pixel data from the pixel in the corresponding location and the second pixel in the corresponding location to determine combined pixel data in the corresponding location, wherein the combined pixel data in the corresponding location is used for drawing a final pixel in the corresponding location.

In some embodiments, the computing device may determine whether any pixels of the image frame are drawn with high intensity, if any pixels of the image frame are drawn with high intensity, determine that the first image and the second image are not duplicates, and if no pixels of the image frame are drawn with high intensity, determine that the first image and the second image are duplicates.

In some embodiments, the computing device may highlight a portion of the image frame that is drawn with high intensity. In some embodiments, the computing device may generate an enlarged view of the portion of the image frame that is drawn with high intensity, and receive input indicating whether the first image and the second image are duplicates. In some embodiments, based on the input indicating whether the first image and the second image are duplicates, the computing device may tag the first image and the second image to indicate whether the first image and the second image are duplicates.

In some embodiments, the computing device may determine a group of pixels within a threshold distance of each other and drawn with high intensity, and based on a number of pixels in the group of pixels within the threshold distance of each other and drawn with high intensity being greater than a threshold, determine that the first image and the second image are not duplicates.

In some embodiments, optical character recognition might not be performed on the first image and the second image before generating the image frame. In some embodiments, the computing device may darken each pixel on the image frame drawn with low intensity, and brighten each pixel on the image frame drawn with high intensity.

The summary here is not an exhaustive listing of the novel features described herein, and are not limiting of the claims. These and other features are described in greater detail below.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying drawings in which like numerals indicate similar elements.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1:
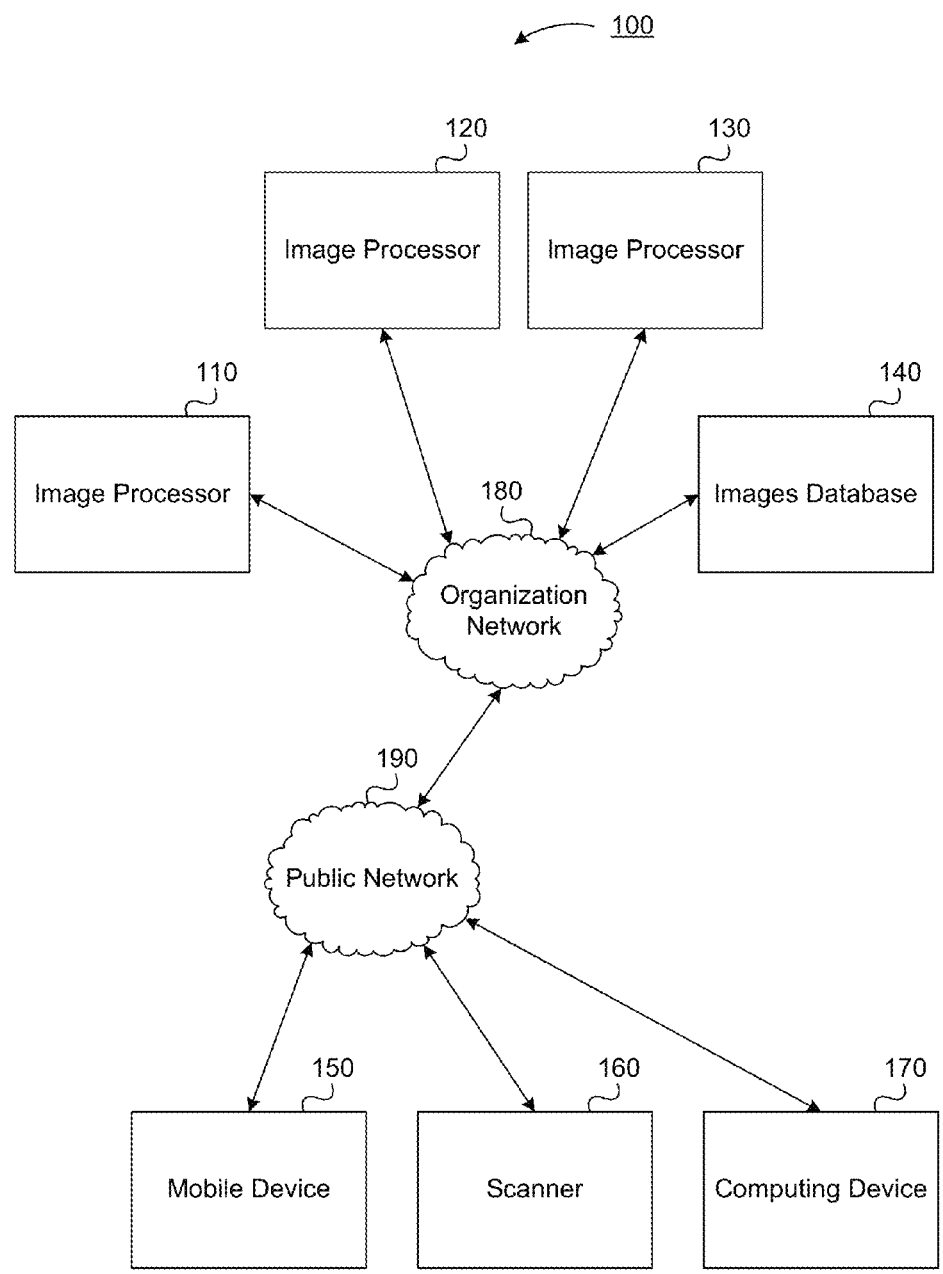
FIGS. 1 and 2 depict an illustrative computing environment in which various features described herein may be implemented.

FIG. 1 depicts an illustrative computing environment for processing images to identify duplicate images. Computing environment 100 may include one or more computing devices. For example, computing environment 100 may include a first image processor 110, a second image processor 120, a third image processor 130, an images database 140, a mobile device 150, a scanner 160, and a computing device 170.

Each of first image processor 110, second image processor 120, and third image processor 130 may be configured to perform one or more image processing functions to identify duplicate images. For example, each of first image processor 110, second image processor 120, and third image processor 130 may be configured to perform one or more of generating hash keys of images, comparing hash keys of images, performing root mean square processing of images to determine duplicate images, and generating visual displays of image variations. For example, first image processor 110—which may be similar to second image processor 120 and third image processor 130—is illustrated in greater detail in connection with FIG. 2.

Regarding FIG. 1, images database 140 may be configured to receive, store, search, and provide images and hash keys of stored images. For example, images database 140 may store images received over public network 190 and/or organization network 180, such as from mobile device 150, scanner 160, computing device 170, or another device, for example. Images database 140 may provide images and/or hash keys of stored images to first image processor 110, second image processor 120, and third image processor 130 for processing images to determine duplicates.

Mobile device 150 may be configured to be used by a client of an organization, an employee of an organization, an individual (e.g., home user), a volunteer, an administrator, or the like. Mobile device 150 may include a camera, which may be used to capture images that are later processed to identify duplicates. For example, mobile device 150 may be used to capture multiple images of a document, photograph, record, paper, person, or other subject. The multiple images may be transmitted over the public network 190 and/or organization network 180, and be processed by one or more of first image processor 110, second image processor 120, and third image processor 130, to identify whether the images are duplicate images of a particular source (e.g., duplicate images of a document, photograph, record, paper, person, or other subject).

Similarly, scanner 160 may be configured to scan images (e.g., documents, photographs, records, birth certificates, death certificates, marriage licenses, military records, litigation discovery documents, lottery tickets, and the like). Scanner 160 may be connected to another computing device (e.g., computing device 170), or may be connected directly to a network (e.g., public network 190 or organization network 180). Similarly to mobile device 150, scanner 160 may transmit scanned images over the public network 190 and/or organization network 180, to be processed by one or more of first image processor 110, second image processor 120, and third image processor 130, to identify whether the images are duplicate images of a particular source.

Similarly, computing device 170 may be configured to generate or receive images, which may then be transmitted over the public network 190 and/or organization network 180, to be processed by one or more of first image processor 110, second image processor 120, and third image processor 130, to identify whether the images are duplicate images.

In one or more arrangements, first image processor 110, second image processor 120, third image processor 130, images database 140, mobile device 150, scanner 160, and computing device 170 may be any type of computing device capable of receiving a user interface, receiving input via the user interface, and communicating the received input to one or more other computing devices. For example, first image processor 110, second image processor 120, third image processor 130, images database 140, mobile device 150, scanner 160, and computing device 170 may, in some instances, be and/or include server computers, desktop computers, laptop computers, tablet computers, smart phones, or the like. As noted above, and as discussed in greater detail below, any and/or all of first image processor 110, second image processor 120, third image processor 130, images database 140, mobile device 150, scanner 160, and computing device 170 may, in some instances, be special-purpose computing devices configured to perform specific functions.

Computing environment 100 also may include one or more networks, which may interconnect one or more of first image processor 110, second image processor 120, third image processor 130, images database 140, mobile device 150, scanner 160, and computing device 170. For example, computing environment 100 may include organization network 180 and public network 190. Organization network 180 and/or public network 190 may include one or more sub-networks (e.g., local area networks (LANs), wide area networks (WANs), or the like). Organization network 180 may be associated with a particular organization (e.g., a corporation, educational institution, governmental institution, or the like) and may interconnect one or more computing devices associated with the organization. For example, first image processor 110, second image processor 120, third image processor 130, and images database 140 may be associated with an organization, and organization network 180 may be associated with and/or operated by the organization, and may include one or more networks (e.g., LANs, WANs, virtual private networks (VPNs), or the like) that interconnect first image processor 110, second image processor 120, third image processor 130, and images database 140 and one or more other computing devices and/or computer systems that are used by, operated by, and/or otherwise associated with the organization. Public network 190 may connect organization network 180 and/or one or more computing devices connected thereto (e.g., mobile device 150, scanner 160, computing device 170) with one or more networks and/or computing devices that are not associated with the organization. For example, mobile device 150, scanner 160, computing device 170 might not be associated with an organization that operates organization network 180 (e.g., because mobile device 150, scanner 160, computing device 170 may be owned and/or operated by one or more entities different from the organization that operates organization network 180, such as one or more clients of the organization, rather than being owned and/or operated by the organization itself or an employee or affiliate of the organization), and public network 190 may include one or more networks (e.g., the internet) that connect mobile device 150, scanner 160, computing device 170 to organization network 180 and/or one or more computing devices connected thereto (e.g., first image processor 110, second image processor 120, third image processor 130, and images database 140).

Figure 2:
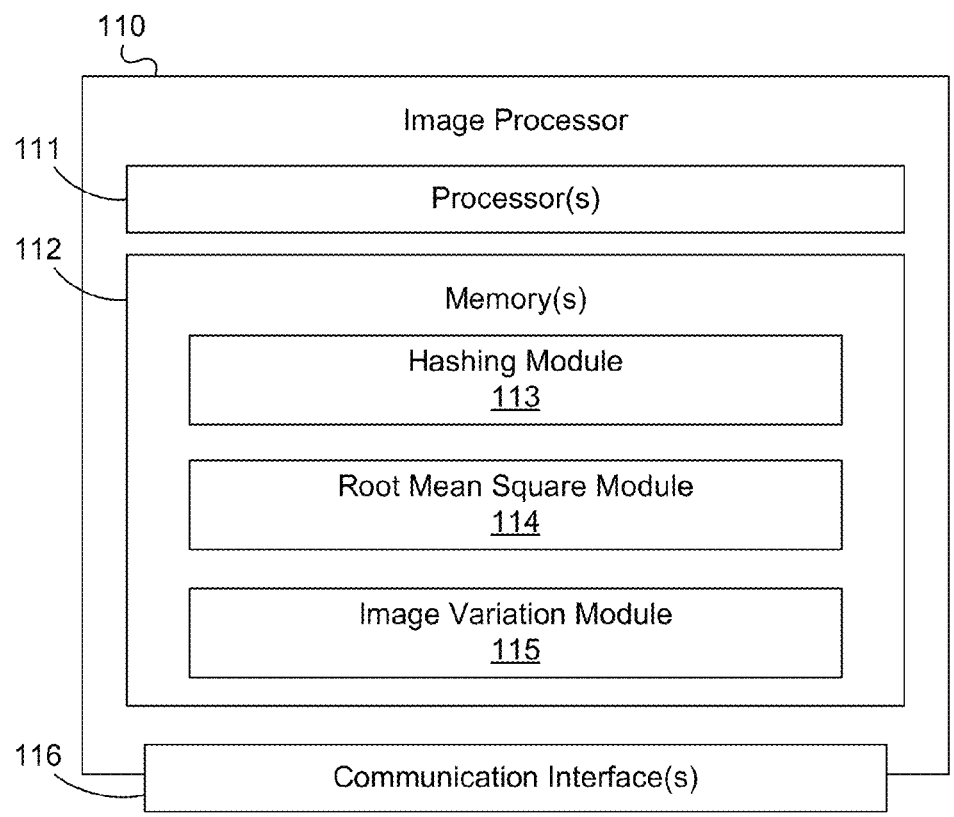

FIG. 2 illustrates first image processor 110, which may include one or more processors 111, memory 112, and communication interface 116. A data bus may interconnect processor(s) 111, memory 112, and communication interface 116. Communication interface 116 may be a network interface configured to support communication between first image processor 110 and one or more networks (e.g., organization network 180, public network 190, or the like). Memory 112 may include one or more program modules having instructions that when executed by processor(s) 111 cause first image processor 110 to perform one or more functions described herein and/or one or more databases that may store and/or otherwise maintain information that may be used by such program modules and/or processor(s) 111. In some instances, the one or more program modules and/or databases may be stored by and/or maintained in different memory units of first image processor 110 and/or by different computing devices that may form and/or otherwise make up first image processor 110 or that are connected to or in communication with first image processor 110 (e.g., images database 140). For example, memory 112 may include a hashing module 113, root mean square module 114, and/or image variation module 115.

Hashing module 113 may provide and/or perform one or more functions that may enable generating one or more hashes or hash keys of one or more images, and comparing the hashes or hash keys of images to determine whether those images are duplicate images, as described in greater detail below.

Root mean square module 114 may provide and/or perform one or more functions that may enable processing of images to determine whether the images are duplicates, including generating byte containers, generating difference data, generating histograms, computing sums of squares, computing root mean values, and analyzing root mean values to determine whether images are duplicates, as described in greater detail below.

Image variation module 115 may provide and/or perform one or more functions that may enable processing of images to generate a visual display of an image frame that visually displays the differences between images. For example, image variation module 115 may resize images, correct or clean up images (e.g., to remove skew, noise, color, and the like), determine a best fit size, generate an image frame, and draw pixels of images using intensity coding, as described in greater detail below.

Other computing devices in computing environment 100 (e.g., second image processor 120, third image processor 130, images database 140, mobile device 150, scanner 160, computing device 170) may have similar components as first image processor 110 (e.g., processor(s) 111, memory(s) 112, communication interface(s) 116).

In some embodiments, second image processor 120 and third image processor 130 may include similar functionality to first image processor 120. For example, in some embodiments, there may be multiple image processors (e.g., first image processor 110, second image processor 120, third image processor 130, and Nth image processor (not pictured)). The multiple image processors may be used for processing multiple different images (e.g., an organization may have multiple employees working on image processing, each using a different image processor). In some embodiments, each image processor may be configured to perform each of the functions illustrated in connection with first image processor 110. In some embodiments some image processors may be configured to perform a subset of the functions illustrated in connection with first image processor 110, while other image processors are configured to perform additional functions in addition to the functions illustrated in connection with first image processor 110.

Figure 3:
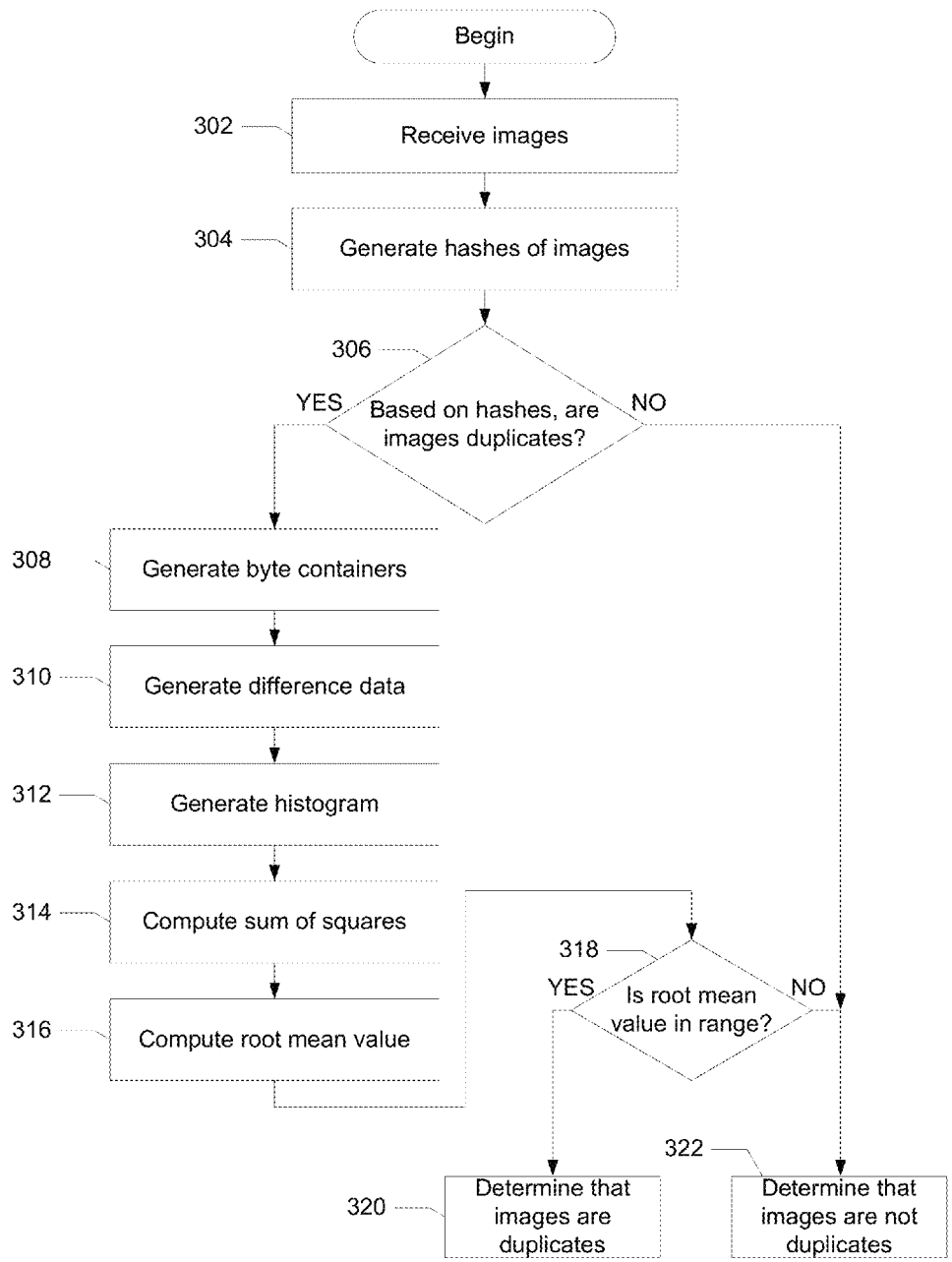
FIGS. 3, 4, and 5 depict illustrative process flows for implementing various features described herein.

FIG. 3 depicts an illustrative flow for processing images to determine duplicate images.

In step 302, the system may receive one or more images. The system may receive images over a network, from input to the system (e.g., a keyboard, mouse, trackpad, scanner, camera), from media (e.g., compact disc, digital versatile disc, high density disc, flash memory), or the like.

In step 304, the system may generate at least one hash of each image. For example, the system may generate a first hash for the first image, a second hash for the second image, and the like. In another example, the system may generate more than one hash for a particular image. For example, the system may generate a first hash and a second hash for the first image.

The system may generate the one or more hashes using a hashing algorithm. For example, the hashing algorithm may generate a difference hash (e.g., a dhash). Alternatively or additionally, the hashing algorithm may generate a perceptive hash (e.g., a phash). Alternatively or additionally, the hashing algorithm may generate an average hash (e.g., an ahash). The hashing algorithm may generate one or more additional or different types of hashes. The hashing algorithm may create similar output hashes based on similar inputs. Therefore, similar images may result in similar hashes.

In step 306, the system may compare the hashes to determine whether, based on the images, the images are duplicates. For example, if the hash may be represented as an array of characters, the system may compare each character in the array of characters of the first hash to each character in the array of characters of the second hash. In another example, a hashing algorithm may output a compressed or simplified image. For example, a 1920×1080 pixel resolution image may be hashed to generate a 64×64 pixel image. In some aspects, a hash version of an image may have fewer colors than an image used to generate that hash. For example, an image may have 64 million colors, but a hash of that image may have fewer colors (e.g., 8 colors, 16 colors, 32 colors, 64 colors). When comparing hashes for multiple images, the system may compare each pixel of a first hash image (e.g., a compressed or simplified image) to a corresponding pixel of a second hash image. For example, the system may compare the top left pixel of the first image to the top left pixel of the second image, the pixel immediately to the right of the top left pixel of the first image to the pixel immediately to the right of the top left pixel of the second image, and so on. The system may thus compare every corresponding pixel of the hashes of two or more images.

If a large enough percentage of the hashes for multiple images are similar, then those images may be duplicates. If, however, a large enough percentage of the hashes for the multiple images are not similar, then those images are likely not duplicates.

The system may use a threshold for determining whether multiple images are sufficiently similar. The threshold may be based on a type of image being compared. For example, if the system is comparing images of faces, the threshold similarity level to determine duplicate images may be different than if the system is comparing images of scanned documents. The threshold may be, for example, 90% similarity between different hashes, 92.5% similarity between different hashes, 95% similarity between different hashes, 98.5% similarity between different hashes, 100% similarity between different hashes, or another percentage similarity between different hashes.

If the hashes are not sufficiently similar (e.g., below the threshold), the system may, in step 322, determine that the images are not duplicates.

If, however, the hashes are sufficiently similar (e.g., above the threshold), the system may perform further processing. In some aspects, hash comparisons may be reliable for determining that images are not duplicates, but might not be reliable for determining that images are duplicates. Therefore, the system may perform further processing to more reliably determine whether images that may be considered duplicates based on a hash comparison are actually duplicates. Thus, the hash comparison may, in some aspects, be used to perform an initial-pass filter, while one or more additional methods are used for performing a second- or third-pass filter. By performing multiple levels of filtering, a duplicate-image-detection process may be performed more quickly.

One method for determining whether two images are similar is a root-mean-square comparison, which is described in detail below.

In step 308, the system may generate a byte container for each image being compared. The byte container may be a data structure for storing data. For example, a byte container may be an array of bytes representing the image. To generate the byte container, the system may use lossless format (e.g., raw ARGB) or a compressed format (e.g., JPEG).

In step 310, the system may generate difference data. In some aspects, if two images are being compared, the system may subtract the byte container for the first image from the byte container for the second image. For example, if a byte container contains a number of elements, the system may subtract a first element of the first byte container from a first element of the second byte container to obtain a value for a first element of the difference data, a second element of the first byte container from a second element of the second byte container to obtain a value for a second element of the difference data, and so on. Thus, the difference data may represent the differences between the first image and the second image. For example, if the first image and the second image are identical, then the difference data would be null, because there is no difference between the first image and the second image.

The difference data may include standard arithmetic image data from one or more planes of the image. For example, the planes of the image may include one or more of a size, a color, a resolution, a red channel, a green channel, a blue channel, and an alpha channel.

In step 312, the system may generate a histogram using the difference data. The histogram may include a representation of tonal distribution. In some aspects, if the difference data is used to generate the histogram, the histogram may represent differences in tonal distribution between the first image and the second image. In some aspects, a histogram may include a graphical representation.

In step 314, the system may compute a sum of squares using the histogram.

In step 316, the system may compute a root mean value using the sum of squares.

In step 318, the system may determine whether the root mean value is within a range of values. The range of values may be based on a type of the images being compared. For example, the range of values may be a first range if the images being compared are a first type of images, and the range of values may be a second range if the images being compared are a second type of images. For example, scanned images of handwritten pages may have a different range of values than scanned images of documents.

The range of values may be determined based on testing images of a particular type. For example, a plurality of pairs of sample images that are known to be duplicates may be used to determine a root mean value. For example, 100 or 1000 pairs of images that are known to be duplicate images, but that have varying characteristics (e.g., scanned vs. photographs, different resolutions, different colors, different sizes, noisy images, skewed images, and the like) may be used to determine root mean values. Then, a range may be determined based on the range of root mean values for the sample images. Thus, the range of root mean values may be determined, which may later be used for testing additional images to determine whether those additional images are duplicates. An illustrative flow for determining a range of values is discussed in connection with FIG. 4.

A range of values may be used because two images that are duplicates might not be literally identical. For example, one image may have noise, skew, or some other difference from another image, even if both images are duplicates (e.g., both images of a same scanned document, photograph, or the like). By determining, based on a set of sample images that are known duplicates, an acceptable range of differences—which may exist based on noise, skew, size, or other factors—the system may robustly determine duplicate images, even if those duplicate images are not literally identical.

If the root mean value is within the range of values, then the system may, in step 320, determine that the images being compared are duplicate images. If the root mean value is not within the range of values, then the system may determine that the images are not duplicates.

Figure 4:
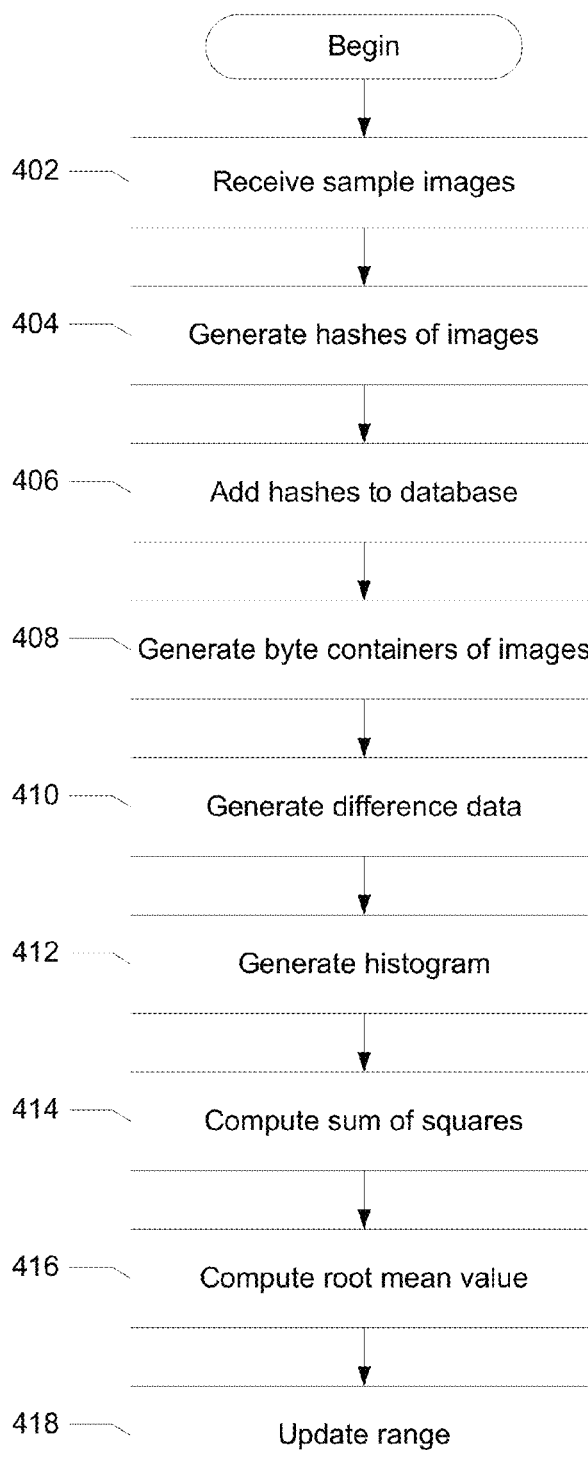

FIG. 4 depicts an illustrative flow for a system to determine a range of values. The process depicted in FIG. 4 may be performed multiple times to determine additional data points for a particular range of values, or may be performed to determine different ranges of values for different types of images. For example, a sample set of scanned documents may be used to determine an acceptable range of values for scanned documents. A sample set of photographs of documents may be used to determine a different acceptable range of values for photographs of scanned documents.

In step 402, the system may receive sample images. The sample images may be known duplicates of each other. There may be two or more sample images that are duplicates of each other.

In step 404, the system may generate hashes of the sample images. In step 406, the system may add the hashes to a database with hashes of images. Then, the database may be used to determine if a later image to be processed is a duplicate of one of the images for which the hash is stored in the database.

In step 408, the system may generate a byte container for each sample image.

In step 410, the system may generate difference data for each set of sample images. For example, the system may subtract the values of a byte container for the first image from the values of the byte container for the second image.

In step 412, the system may generate a histogram using the difference data.

In step 414, the system may compute a sum of squares using the histogram.

In step 416, the system may compute a root mean value using the sum of squares.

In step 418, the system may update the range based on the root mean value. In some aspects, the system may collect a number of root mean values for different pairs of sample images that are known duplicates. Then, based on those root mean values, the system may determine an acceptable range of values. For example, the system may evaluate the collection of root mean values for the number of sample images, and determine if there is any clustering or concentration of values. A clustering or concentration of values may indicate that the majority of duplicate images fall within a certain range (e.g., where the clustering or concentration of values falls). In one example, if the root mean value for 1000 pairs of known duplicate images is calculated, and 995 of the root mean values are within a particular range, while the other 5 root mean values are outside that particular range (e.g., the other root mean values are outliers), then the system may set the range of acceptable values as the particular range where the 995 root mean values fall.

The range of acceptable values may be used, as noted above, for evaluating images to determine whether those images are duplicates. Alternatively, the system may use a range of values that includes the full range of values, including any outliers. In some embodiments, the system may use a first range of values to determine duplicates, and a second or additional range of values to determine that images are possible duplicates. For example, if the root mean value is within the first range of values, the system may determine that the images are duplicates. If the root mean value is within the second range of values, the system may determine that the images are possible duplicates, and flag the images, for example, for additional evaluation (e.g., manual determination). If the root mean value is within a third range of values (or, e.g., outside the second range of values), the system may determine that the images are not duplicates.

As noted above, in some embodiments, the system may use a particular range of values that is tuned for a particular application. For example, if the system is being used for processing checks to determine duplicates, the system may use a first range of values, which is calculated based on performing a training sequence (e.g., a sequence similar to the one depicted in FIG. 4) using a number of sample checks. In another example, if the system is being used for processing passports to determine duplicates, the system may use a second range of values, which is calculated based on performing a training sequence (e.g., a sequence similar to the one depicted in FIG. 4) using a number of sample passports. Thus, in some embodiments, the system may be used for comparing images of a particular type to determine duplicates. Alternatively, in other embodiments, the range may be established using a broader set of criteria (e.g., using a number of different types of images or documents as samples), and thereby allow the system to detect duplicates of a variety of types of images or documents.

Figure 5:
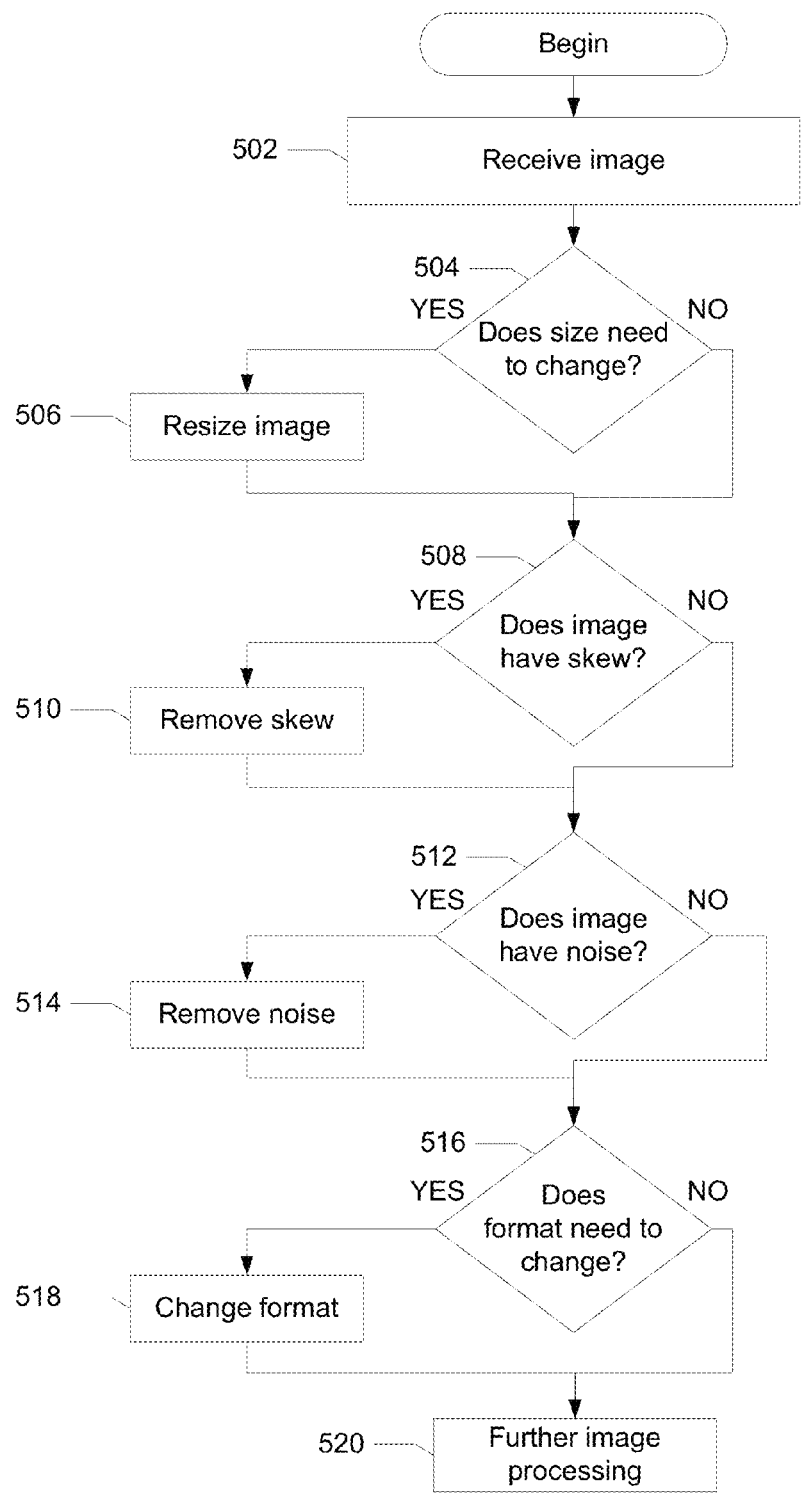

FIG. 5 is an illustrative flow diagram of a process for receiving and preparing images for processing. When determining whether images are duplicates, it may be helpful to have images be consistent in size, format, and the like. Some images, however, might not be the same size, format, or the like. Therefore, by standardizing the images for processing, the system may potentially improve the likelihood of accurate duplicate image detection.

In step 502, the system may receive an image. For example, if the system is processing images of documents, the system may receive images of documents generated by a scanner, images of documents taken by a cellular phone camera, images of documents generated by a document generating driver of a computer, or the like.

In step 504, the system may determine whether the image size needs to change. For example, if the system is comparing two images to determine whether the two images are duplicates, the system may compare the size of the two different images. Additionally or alternatively, the system may compare the aspect ratio of the two different images to determine if the aspect ratio of the two different images is different. If the size and/or the aspect ratio of the two different images is different, the system may determine that one or both of the images needs to be resized, and may resize one or both of the images in step 506.

In step 508, in some embodiments, the system may determine whether the image has skew. For example, if the image is an image of a document, the edge of the document might not be parallel with the edge of the image. If the system determines that the image has skew, then the system may, in step 510, remove the skew from the image (e.g., by rotating and/or cropping the image so that the edge of the document is parallel with the edge of the image).

In some embodiments, step 508 and step 510 may be optional. For example, the system may tolerate skew in images up to a certain threshold (e.g., 2% skew) without losing effectiveness in determining duplicates. Therefore, in some embodiments, the system might not detect or remove skew as a part of processing the image, as the system may be capable of detecting a duplicate image, even if the image has skew. In other embodiments, the system may remove skew before processing the image. In further embodiments, the system may detect whether an image has skew above a defined threshold (e.g., a skew tolerance threshold, which may correspond to an amount of skew that the system may tolerate). If the image has no skew or skew at or below the threshold, the system may process the image without removing the skew. If the image has skew above the threshold, then the system may remove the skew or reduce the skew to be at or below the threshold, then continue processing the image.

In step 512, the system may determine whether the image has noise. If the image has noise, the system may, in step 514, remove the noise from the image.

In some embodiments, step 512 and step 514 may be optional. For example, the system may tolerate noise in images up to a certain threshold (e.g., 2% noise) without losing effectiveness in determining duplicates. Therefore, in some embodiments, the system might not detect or remove noise as a part of processing the image, as the system may be capable of detecting a duplicate image, even if the image has noise. In other embodiments, the system may remove noise before processing the image. In further embodiments, the system may detect whether an image has noise above a defined threshold (e.g., a noise tolerance threshold, which may correspond to an amount of noise that the system may tolerate). If the image has no noise or noise at or below the threshold, the system may process the image without removing the noise. If the image has noise above the threshold, then the system may remove the noise or reduce the noise to be at or below the threshold, then continue processing the image.

In step 516, the system may determine whether the format of the image needs to change. For example, if the system more efficiently processes images in a particular format (e.g., TIFF), and the image is in a format other than the particular format (e.g., JPG), then the system may convert the image to the particular format in step 518.

In step 520, the system may continue with further image processing, such as, for example, the processing described in FIG. 3 for determining whether the image is a duplicate image.

Figure 6:
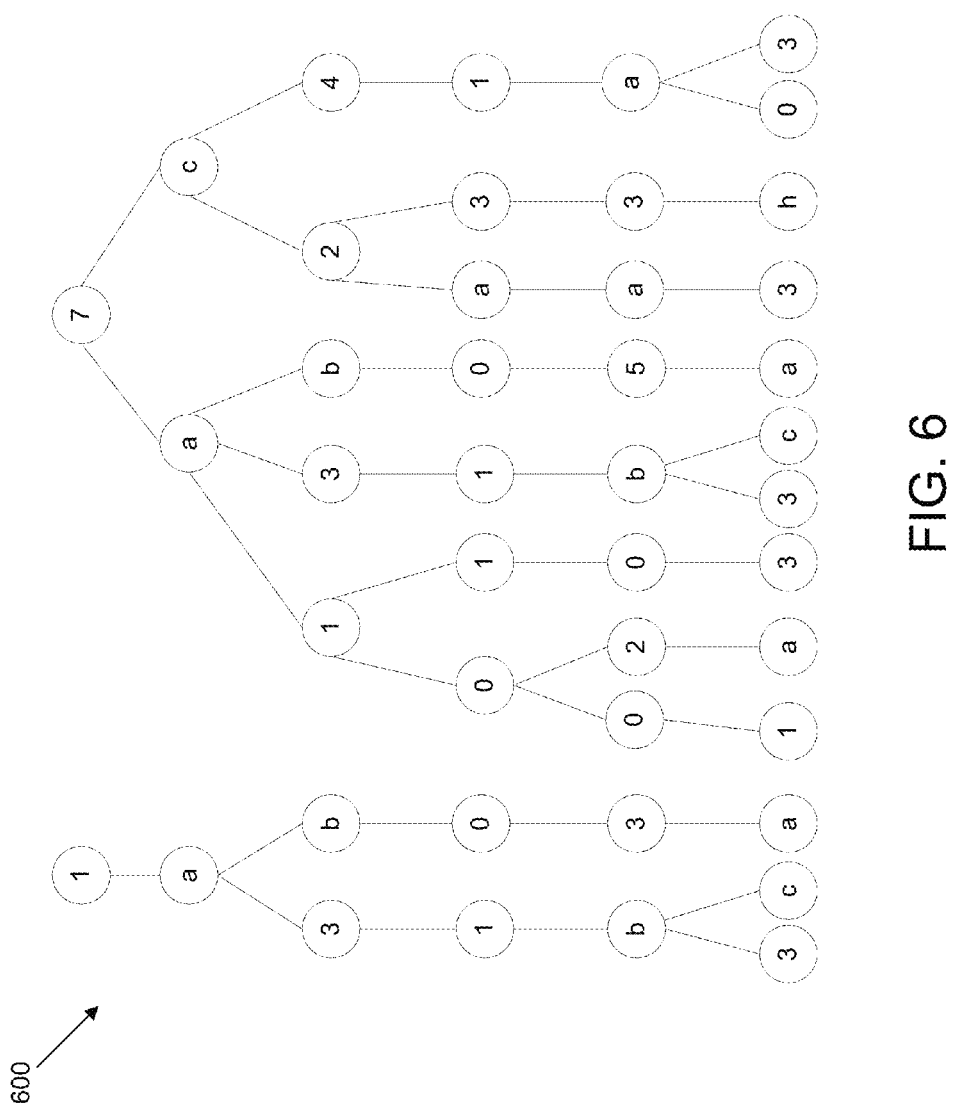
FIG. 6 depicts an illustrative data structure for storing data created in accordance with various features described herein.

FIG. 6 is a visual depiction of an illustrative data structure that may be used for storing one or more hashes. In some aspects, a data structure may be used as part of a database. The data structure may be similar to a linked list or a tree. The data structure may allow for rapid retrieval of a stored hash, or for comparison of a new hash to existing hashes.

In the data structure illustrated in FIG. 6, each character of a hash is represented by a different node. A first character of a hash is added as a first node. If a character already exists, then the hash is added in a connection to that node, rather than as a new set of nodes. For example, the hashes "1a31b3" and "1a31bc" are graphically illustrated using the same first five nodes, based on the hashes sharing the first five characters (e.g., "1a31b"). In another example, the hashes "7a1001" and "7a31b3" are graphically illustrated using the same first two nodes, based on the hashes sharing the first two characters (e.g., "7a"). When there is a difference in characters, a new node is created, linked to the previous node, with the remaining characters added as new nodes after that new node.

Figure 7:
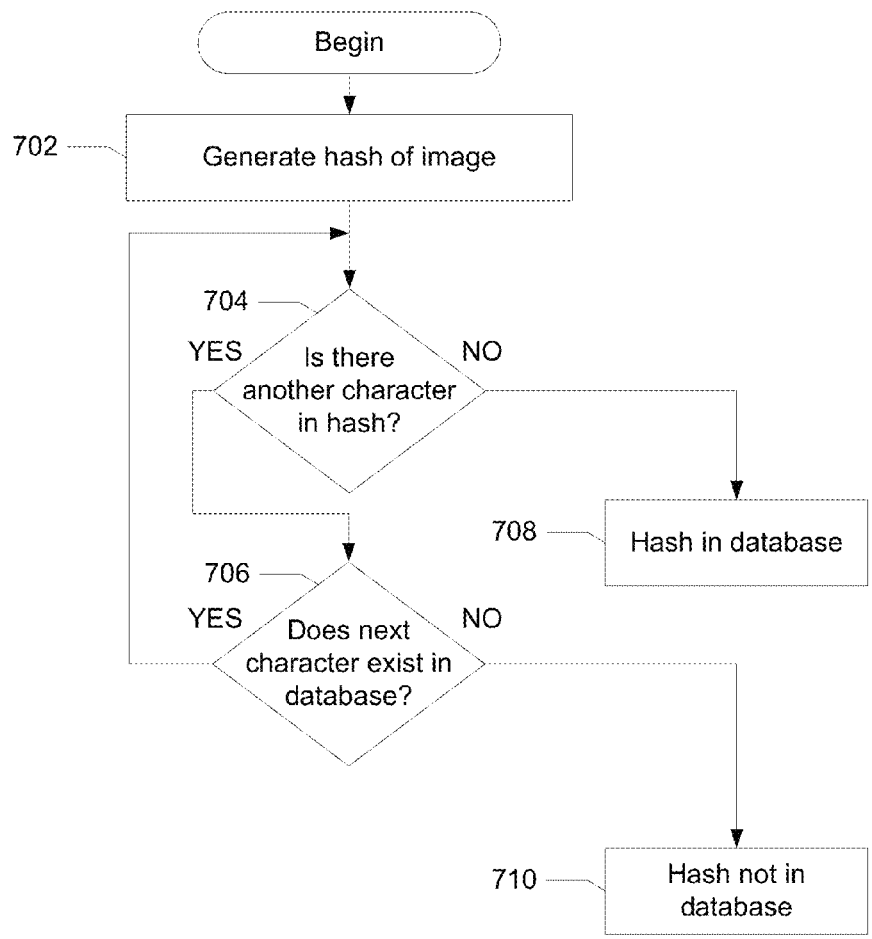
FIGS. 7 and 8 depict illustrative process flows for implementing various features described herein.

The data structure illustrated in FIG. 6 allows for quickly and efficiently determining whether an existing hash is already in the database, as described further in connection with FIG. 7. For example, if a hash begins with a character other than those represented by the top-level nodes (e.g., as illustrated in FIG. 6, a "1" or "7"), then that hash is not already in the data structure.

A similar comparison can be made for each character. For example, if a first character is found in the database (e.g., as illustrated in FIG. 6, a "1" or "7"), but a second character is not found in the database (e.g., as illustrated in FIG. 6, an "a" after a first character "1", or an "a" or "c" after a first character "7"), then that hash is not already in the data structure. Thus, by determining at each character (or corresponding node) whether that character is in the database in that position, a search may quickly and efficiently be made to determine whether a hash is already in the database.

FIG. 7 is an illustrative flow diagram of a process for determining whether a hash of an image is a duplicate of another image. In some aspects, the system may store a database of hashes of images. The system may store a hash of each image that has been processed (e.g., using a data structure similar to the one depicted in FIG. 6), which may later be used for determining if a later image is a duplicate image of an image that has been processed. For example, the system may be used for digitizing and storing documents. For example, government records, family history documents, litigation discovery documents, checks, reports, corporate or enterprise records, or other documents may exist in large numbers and/or in paper form. Images could include scanned images, photographs, documents, digital document printouts, or another type of image. The system may be used for processing and storing those documents. To more efficiently store documents, the system may determine whether additional documents to be stored already exist in storage, and thereby avoid storing duplicate copies of documents. In addition to storing the documents, the system may also store a hash of each image that has been stored. In some embodiments, the system may compare a new image to each image already stored, to determine whether the new image is a duplicate of an already stored image. Alternatively or additionally, the system may compare the hash of the new image to the hash for each image already stored, to determine whether the new image is a duplicate of an already stored image. By comparing hashes rather than the images themselves, the system may more efficiently select images for further processing (e.g., select, based on the hash comparison, a subset of the already stored images for comparing with the new image to determine whether the new image is a duplicate of an already stored image).

In step 702, the system may generate a hash of an image (e.g., using a dhash, phash, or ahash).

If the database stores hashes using a data structure similar to the one depicted in FIG. 6, the system may use a process similar to the process depicted in FIG. 7 to efficiently determine if a hash similar to the hash of the new image is stored in the database.

In some embodiments, the hash may be represented as an array of characters. In step 704, the system may determine if there is another character in the hash. For example, if the system has not processed any characters of the hash, then the system may start with the first character of the hash. If the system has already processed the first character of the hash, and there are at least two characters in the hash, then the system may select the second character of the hash, and so on.

After selecting the next character for comparison, the system may determine if the character is in the database. For example, in the hashes depicted in the data structure in FIG. 6, the first character of every stored hash is a "1" or a "7." Therefore, in step 706, the system may determine if the next character exists in the database. Using the data illustrated in FIG. 6 as an example, if the first character in the hash of the new image is not a "1" or a "7", then the system may determine in step 710 that the hash is not in the database.

In some embodiments, the system may do an exact comparison (e.g., look for an exact match of the hash). Alternatively or additionally, the system may perform a fuzzy comparison (e.g., see if there is a close match). For example, the system may determine if there is something close to the next character of the hash. For example, if the next character in the hash of the new image is a "0" or a "2", and a "1" is stored in the database, then the system may determine that the character is close enough to continue evaluating the hash.

In step 706, if there is a match between the next character in the hash and the hashes in the database, the system may return to step 704 to check if there is a next character in the hash. If there is not another character, then that may mean that every character has matched, and the system may go to step 708 and determine that the hash matches a hash in the database. The system may then, for example, perform further processing to determine if the new image is actually a duplicate of an existing image (e.g., with a process similar to the process depicted in FIG. 3).

If, however, there is another character in the hash of the new image, the system may retrieve the next character and continue evaluating to determine if there is a matching hash stored in the database.

For example, if the first character of the hash of the new image is a "1", and the second character of the hash of the new image is a "c", and the database is similar to the one depicted in FIG. 6, then the system may determine that the first character is stored in the database, but that the second character is not stored in the database. If, however, the second character of the hash of the new image is an "a", for example, then the system may determine that the second character is found after the first character, and continue evaluating.

Thus, by storing the hashes using a data structure similar to the data structure depicted in FIG. 6, combined with a search algorithm similar to the flow depicted in FIG. 7, the system may efficiently compare hashes of new images to stored hashes of other images to determine if there is a potential duplicate image. The system may alternatively or additionally use a different data structure or database configuration for storing the hashes, and/or a different algorithm for comparing a hash of a new image to hashes of existing images stored in the database.

Figure 8:
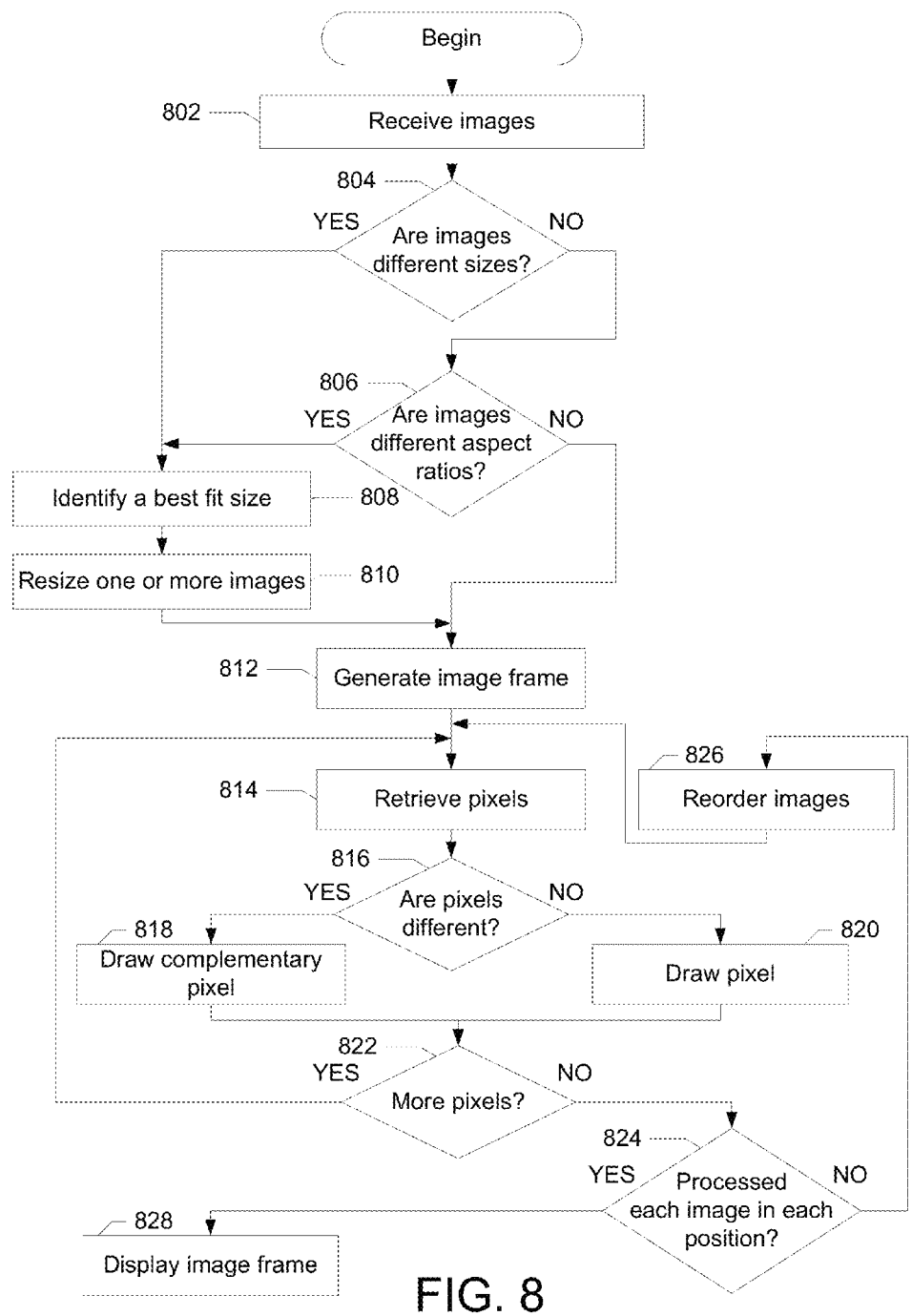

FIG. 8 depicts an illustrative flow of a process for providing a visual depiction of variations in images. In some aspects, a system may perform automated image processing to determine duplicate images. Some images, however, may be further processed or analyzed using manual techniques. For example, two images may be displayed side-by-side for manual verification of whether the images are duplicates. Providing a visual display of variations between the two images may allow for a more efficient or effective manual verification of duplicate images.

In step 802, the system may receive images for comparison. For example, the system may receive images from a scanner, a camera, over a network, or the like. The system may receive one image from one source, and another image from another source. For example, the system may receive a new image to be processed, and another image from a database of stored images. The system may receive two images, or more than two images.

In step 804, the system may determine whether the images are different sizes. For example, the system may compare a width of a first image with a width of the second image, and a height of the first image with a height of the second image. If the widths or heights or both differ, then the system may determine that one or more of the images need to be resized.

In step 806, the system may determine if the images are different aspect ratios. For example, the system may compare the aspect ratio of the first image to the aspect ratio of the second image. Determining if the images are different aspect ratios may be performed at the same time as determining if the images are different sizes (e.g., step 804), or at a different time.

If the images are different sizes and/or different aspect ratios, then in step 808 the system may determine a best fit size. A best fit size may be a size that best fits the images being compared. The best fit size may be calculated to minimize skewness or distortion after resizing one or more of the images. A minimal size concept may be used to avoid pixelation. For example, the best fit size may be smaller or equal to the smallest existing size of the images.

In some instances, the best fit size may be the same as the size of one of the images. In other instances, the best fit size may be different than the size of every image. The best fit size may be a size that best fits each image for comparison. The best fit size may be determined based on evaluating the data in different parts of the image, the resolution of each image, the aspect ratio of each image, one or more user settings or preferences, and/or other factors. After determining the best fit size, the system may resize one or more of the images to be the best fit size, in step 810. The resizing may be performed to optimize quality of the resized images. For example, the resizing may be performed using anti-aliasing bias. In another example, the resizing may be performed to avoid or minimize pixelation, skewness, distortion, or the like.

In some embodiments, even if the images are the same size and aspect ratio, the system may still determine the best fit size and resize all the images to be the best fit size. For example, a user preference may define that the system should always resize the images to be a best fit size, and the system may, based on the user preference, always resize the images to be the best fit size.

In some embodiments, the system may determine if the images have different orientations. For example, the first image may be a document with a vertical orientation, while the second image may be a document with a horizontal orientation. If the images have different orientation, then the system may alter one or more of the images to have a same orientation.

The system may in step 812 generate an image frame. The image frame may be the size of the images (e.g., the best fit size), or the image frame may be larger than the size of the images. For example, the image frame may be large enough to center one of the images with a border around the image (e.g., a 5- or 10-pixel or other size border).

In step 814, the system may retrieve pixels from the images being compared. The system may retrieve one pixel from the first image, and one corresponding pixel from the second image. For example, the system may retrieve the pixel at the top left corner of the first image, and also retrieve the pixel at the top left corner of the second image. In another example, the system may retrieve the pixel to the right of the pixel at the top left corner of the first image, and also retrieve the pixel to the right of the pixel at the top left corner of the second image, and so on. The system may retrieve the pixel based on an (x, y) coordinate of the pixel.

The system may retrieve the pixel from the first image and the pixel from the second image using the same (x, y) coordinate for each of the first image and the second image.

After retrieving the pixels, the system may, in step 816, determine if the pixels are different from each other. For example, if one pixel is white, and the other is black, then the pixels may be different from each other. In another example, if both pixels are the same color, then the pixels may be the same as each other.

The system may draw the pixels on the image frame using intensity coding. For example, if the pixels are the same as each other, then the system may, in step 820, draw the pixel with low intensity or high opacity. Alternatively, if the pixels are different from each other, the system may, in step 818, draw the pixel with the complement of the intensity used in step 820. For example, if the system draws pixels that are the same with low intensity (e.g., 20% intensity), then system may draw pixels that are different with complementary intensity (e.g., 1/0.20, or 500% intensity).

In another embodiment, the system may draw the pixels of the first image on the image frame, based on a comparison of the pixels of the first image to the pixels of the second image. For example, if the pixel of the first image is the same as the pixel of the second image, then the system may draw the pixel of the first image. Alternatively, if the pixel of the first image is different from the pixel of the second image, then the system may draw the complement (e.g., the inverse) of the pixel of the first image.

Thus, pixels that are different may be drawn with high intensity or low opacity, and pixels that are the same may be drawn with low intensity or high opacity.

In step 822, the system may determine if there are more pixels. For example, if the system is drawing one pixel at a time, then the system may check if every pixel has been drawn. If there are more pixels to be drawn, then the process may return to step 814, and retrieve more pixels.

In step 824, the system may determine whether the system has processed each image in each position (e.g., as the master or base image, and as the secondary image, the tertiary image, and the like). For example, if there are two images, the system may determine if the first image has been processed as both the first image and the second image.

If each image has not been processed in each position, then in step 826, the system may reorder the images so that the images are processed in different image positions. For example, if there are two images, then the system may process the images twice: once with the first image in a position for the first image, and once again with the first image in a position for the second image. Similarly, the system may process the images once with the second image in a position for the second image, and once again with the second image in a position for the first image. Thus, if the system is drawing the pixels of the first image (or the complements of the pixels of the first image) based on a comparison to the pixels of the second image, then performing the processing again with the second image as the first image and the first image as the second image would result in the pixels of the second image also being drawn.

If there are more than two images, then the system may perform the processing more than two times, with the more than two images in the more than two image positions.

After reordering the images, the system may draw the pixels again (e.g., steps 814-822), based on the reordered images. In some embodiments, each image being processed in each position may result in an image frame corresponding to each round of processing being produced. For example, if the system is processing two images, then the system may produce two image frames with intensity coding: one for the first image as the master or base image, and one for the second image as the master or base image.

After each image has been processed in each position (e.g., as determined in step 824), then the system may, in step 828, display the image frame. In the displayed image frame, similar or same pixels may be displayed with low intensity or high opacity, while pixels that are different may be displayed with high intensity or low opacity. Thus, pixels that are different may be quickly and easily identified based on the displayed high intensity pixels.

If, for example, both images are identical (e.g., the images are duplicate images), then the whole display of the image frame will be low intensity or high opacity (e.g., dark or gray). By contrast, if the images are completely different (e.g., every pixel is different), then the image frame will be completely high intensity or low opacity (e.g., completely white).

In some embodiments, the system may process the image frame to determine whether any pixels are drawn with high intensity. If any pixels are drawn with high intensity, the system may determine that the images are not duplicates. If no pixels are drawn with high intensity, the system may determine that the images are duplicates. The system may determine whether any pixels are drawn with high intensity based on comparing the pixels to a threshold (e.g., an intensity threshold). If no pixels are drawn with an intensity greater than the intensity threshold, then the system may determine that there are no pixels drawn with high intensity. In some embodiments, the system may determine whether the images are duplicates based on a number of pixels of high intensity or low intensity being above or below a threshold (e.g., 99% of pixels being drawn with low intensity may indicate that the images are duplicates).

In some embodiments, the system may determine groupings of pixels with similar intensity to determine duplicate images. For example, if there are only streaks or random pixels throughout the image frame that have high intensity, the high intensity pixels may be due to distortion, skewness, resizing, or other imperfections in the images, even if the images are duplicates. Therefore, for example, the system may determine whether groupings of high intensity pixels exist in a particular portion of the image frame to determine whether the images are duplicates. For example, if a number in one document is different from a number in a same place on another document, the pixels used to draw those numbers on the image frame may be drawn using a high intensity. Therefore, the system may determine that the pixels used to draw the numbers in the same place are high intensity and in a group (e.g., within a threshold distance of each other), and therefore the images might not be duplicates.

In some embodiments, the system may highlight a portion of the document with pixels that are drawn using high intensity. For example, the system may suggest to a user that the user zoom in on a portion of the image with high intensity pixels, to make determining whether the images are duplicates easier for the user. The system may receive input indicating whether the images are duplicate images. The system may tag the images to indicate whether the images are duplicates. For example, the system may tag metadata stored in the database in association with a first image to indicate that the first image is or is not a duplicate of a second image, and the system may tag metadata stored in the database in association with the second image to indicate that the second image is or is not a duplicate of the first image. In some instances, the system might not store the second image if the second image is a duplicate of the first image.

In some embodiments, drawing the image frame with intensity coding may be performed without performing optical character recognition of the images (e.g., images of documents). Thus, the image frame may be displayed, with highlighting of differences between the images, with very fast processing times.

FIGS. 9A-9D depict illustrative graphical user interface screens for processing images to determine if the images are duplicates. The interface depicted in FIGS. 9A-9D shows two images being compared, but more than two images may be compared.

Figure 9A:
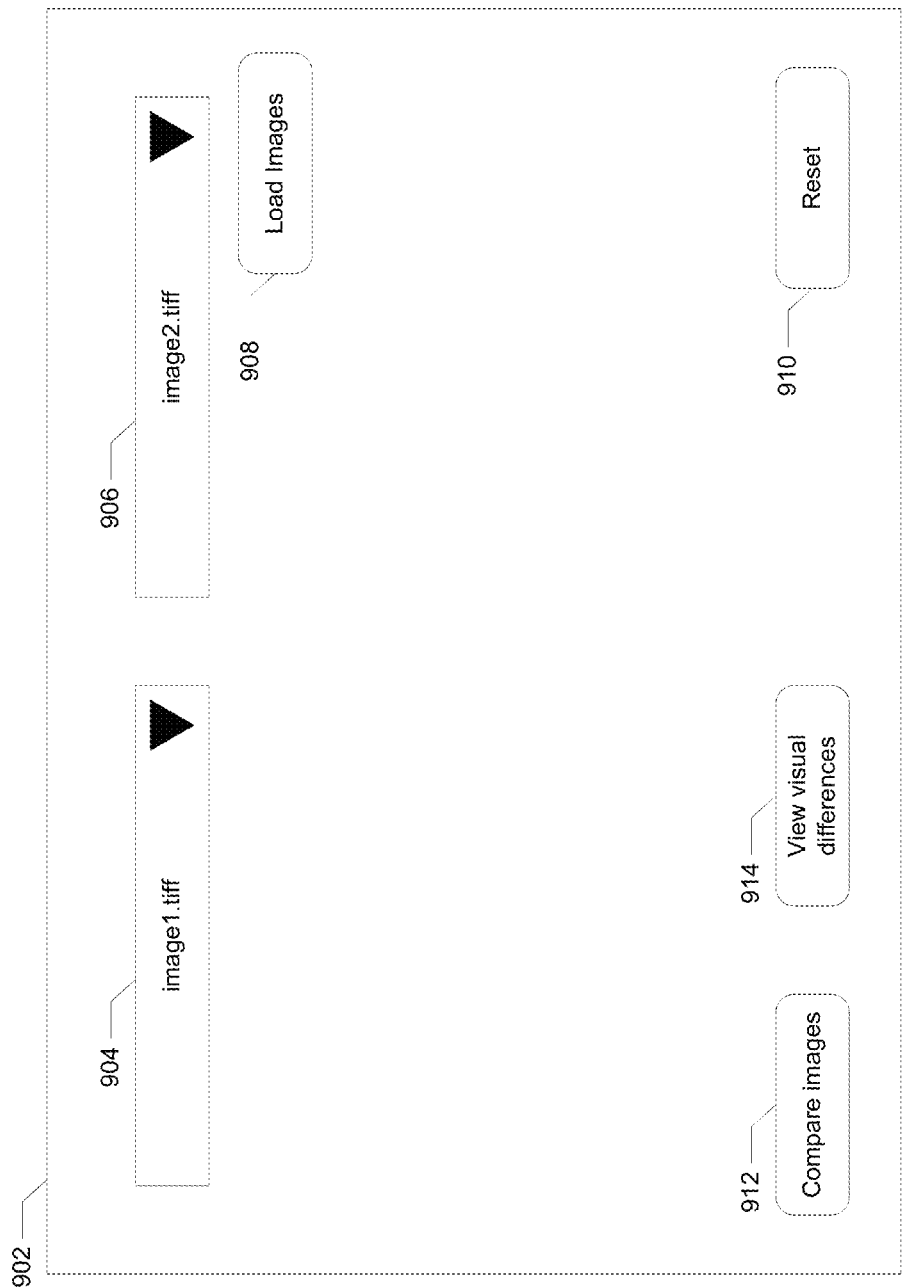
FIGS. 9A-9D and 10A-10B depict illustrative graphical user interfaces that may be used to implement various features described herein.

FIG. 9A depicts an illustrative graphical user interface (e.g., screen 902) for selecting and loading two images for comparison. Screen 902 includes selector 904, which may allow for selection of a first image, and selector 906, which may allow for selection of a second image. Selector 904 and selector 906 may each include a drop-down menu.

Load button 908, when selected, may initiate loading of the images selected in selector 904 and selector 906.

Reset button 910, when selected, may reset the interface, which may include clearing any loaded images, and clearing selector 904 and selector 906.

Compare images button 912, when selected, may initiate a compare images process. The compare images process may be similar to the process described in FIG. 3. The compare images process may be accompanied by an interface similar to the interface depicted in FIG. 9C.

Screen 902 may also include view visual differences button 914, which, when selected, may initiate a visual differences process. The visual differences process may be similar to the process described in FIG. 8. The visual differences process may be accompanied by an interface similar to the interface depicted in FIG. 9D.

Figure 9B:
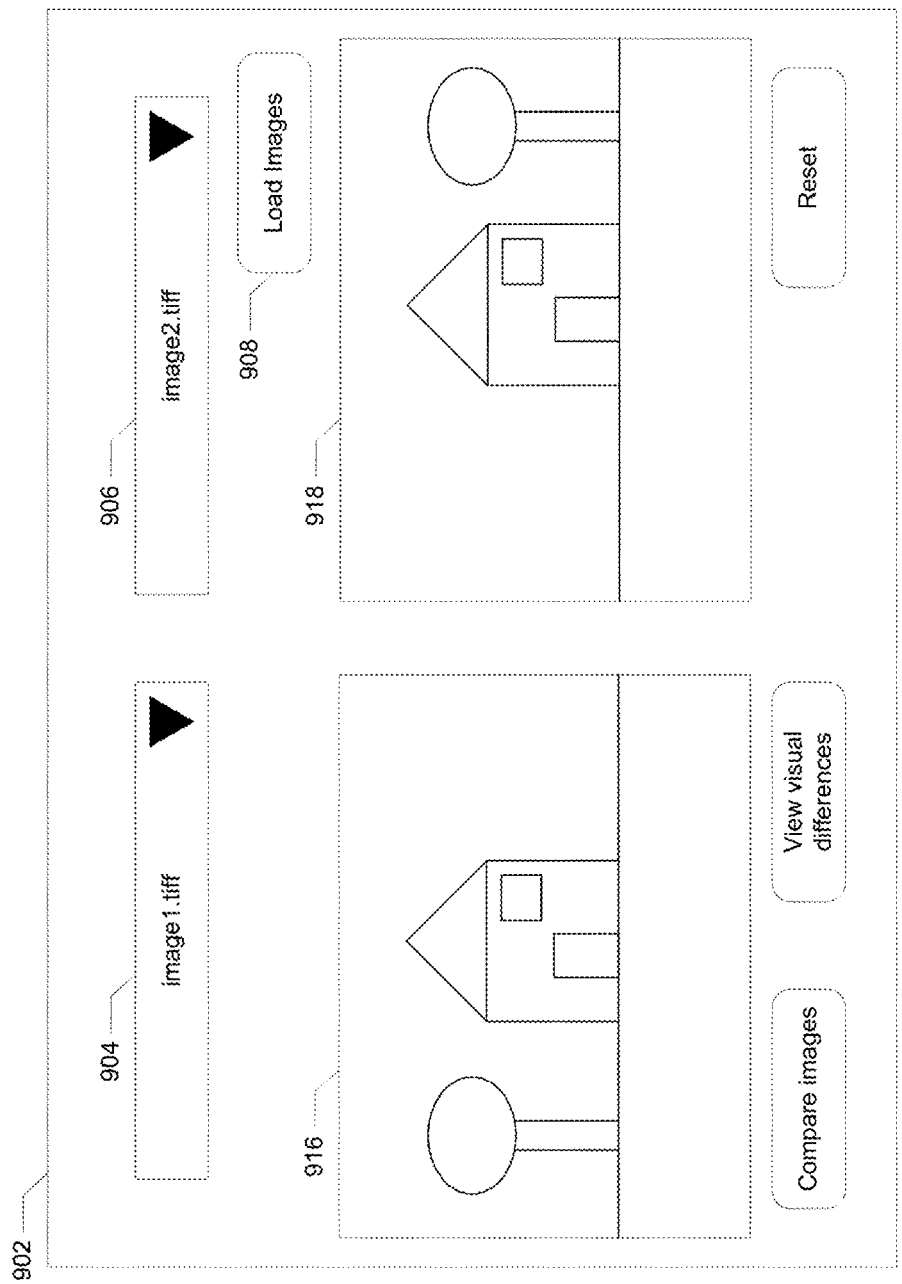

FIG. 9B depicts an illustrative graphical user interface that may be displayed after two images are loaded for comparison. For example, a first image (e.g., image 916) may be displayed corresponding to the image selected in selector 904, and a second image (e.g., image 918) may be displayed corresponding to the image selected in selector 906. The first and second image may be displayed, as depicted in FIG. 9B, after selection of load button 908.

Figure 9C:
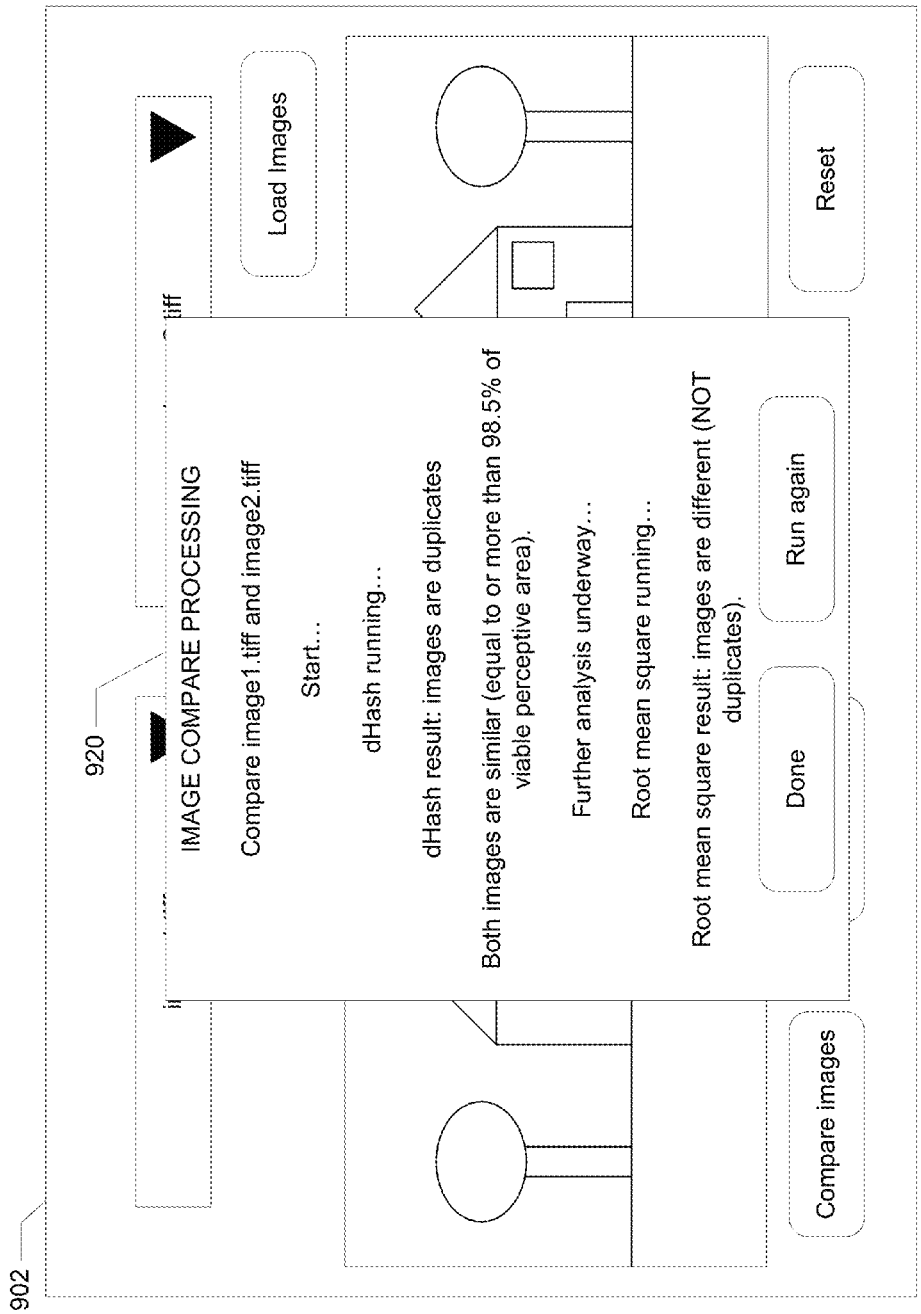

FIG. 9C depicts an illustrative graphical user interface that may be displayed corresponding to the compare images process. For example, if compare images button 912 is selected from screen 902 depicted in FIG. 9B, then pop-up window 920 may be displayed, as depicted in FIG. 9C. Pop-up window 920 may be displayed, which may progressively display additional information corresponding to the process being performed. For example, if the system is performing a process similar to the process described in FIG. 3, then the system may display textual information regarding a phase of the process being performed.

For example, as depicted in FIG. 9C, if the system is comparing "image1.tiff" and "image2.tiff," then pop-up window 920 may say "Compare image1.tiff and image2.tiff." When the system is performing a dHash of image1.tiff and image2.tiff, pop-up window 920 may say "dHash running . . . " If, based on the dHash comparison of image1.tiff and image2.tiff, if the system determines that image1.tiff and image2.tiff are duplicates (e.g., the hash of image1.tiff and the hash of image2.tiff match within the threshold tolerance level), then pop-up window 920 may say, "Both images are similar (equal to or more than 98.5% of viable perceptive area). Further analysis underway . . . "

The system may perform a root mean square comparison of image1.tiff and image2.tiff, and determine if the two images are duplicates. If, based on the root mean square comparison results, the system determines that the two images are not duplicates, then pop-up window 920 may say, "Root mean square result: images are different (NOT duplicates)."

The exact wording, formatting, order, or other attributes of pop-up window 920 or screen 902 may be different in a different embodiment. For example, the screen may indicate progress through the image duplicate detection process in different ways (e.g., a status bar, pop-up alerts, text notifications, graphic notifications, and the like).

Figure 9D:
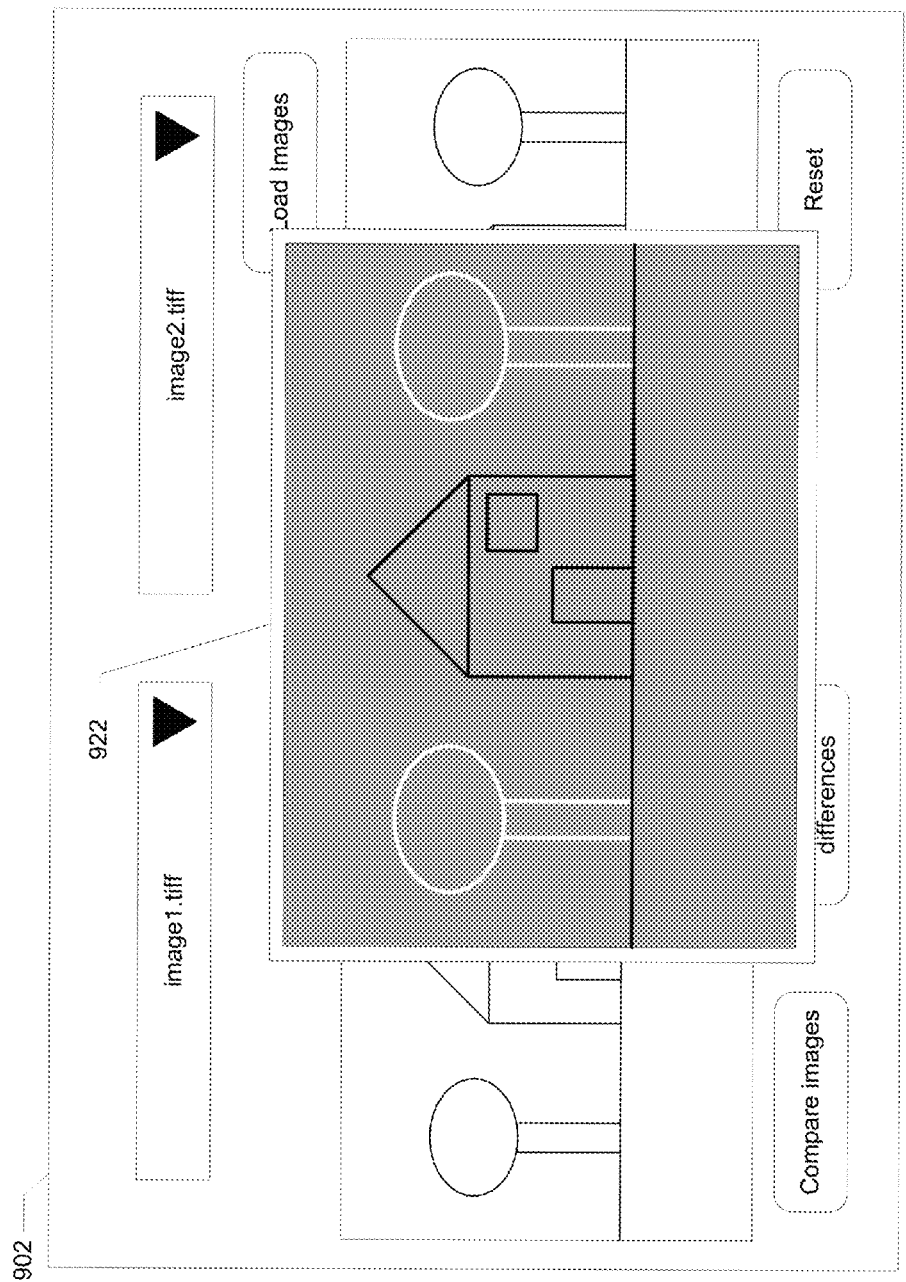

FIG. 9D depicts an illustrative graphical user interface that may be displayed corresponding to the visual differences process. For example, if view visual differences button 914 is selected from screen 902 depicted in FIG. 9B, then image frame 922 may be displayed, as depicted in FIG. 9D. Image frame 922 may be displayed, which may show visually the differences between selected images (e.g., image1.tiff and image2.tiff). Image frame 922 may be generated during a process similar to the process described in connection with FIG. 8.

Image frame 922 may visually display the differences between two images. Similarities between the images may be drawn using low intensity or high opacity. Differences between the images may be drawn using high intensity or low opacity. Thus, the differences between multiple images may be quickly identified based on a visual inspection of image frame 922.

Figure 10A:
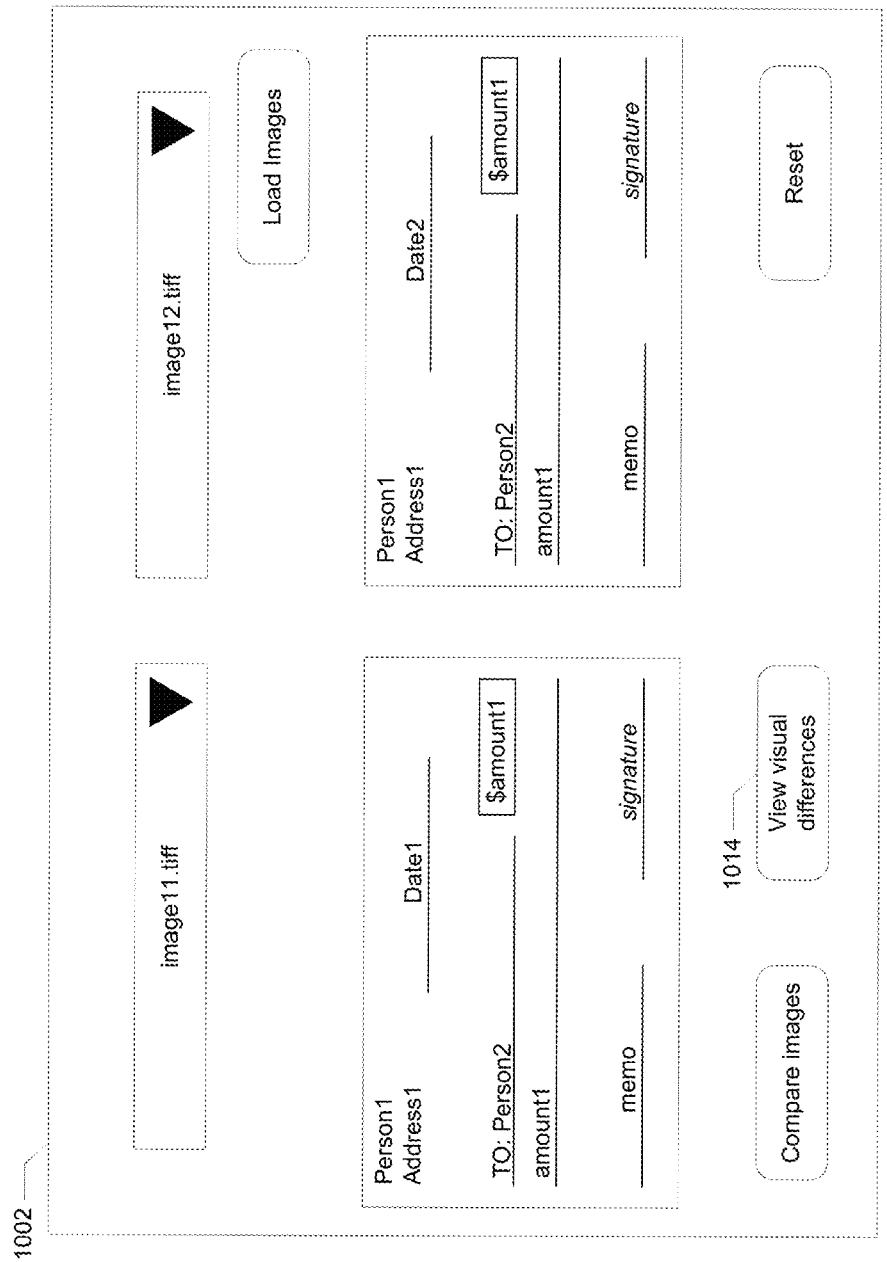

FIG. 10A depicts an illustrative graphical user interface of an embodiment used for comparing two documents. As depicted in FIG. 10A, images of checks may be compared to determine if the checks are duplicates. A process similar to the processes described herein may be used for determining whether the checks are duplicates.

Figure 10B:
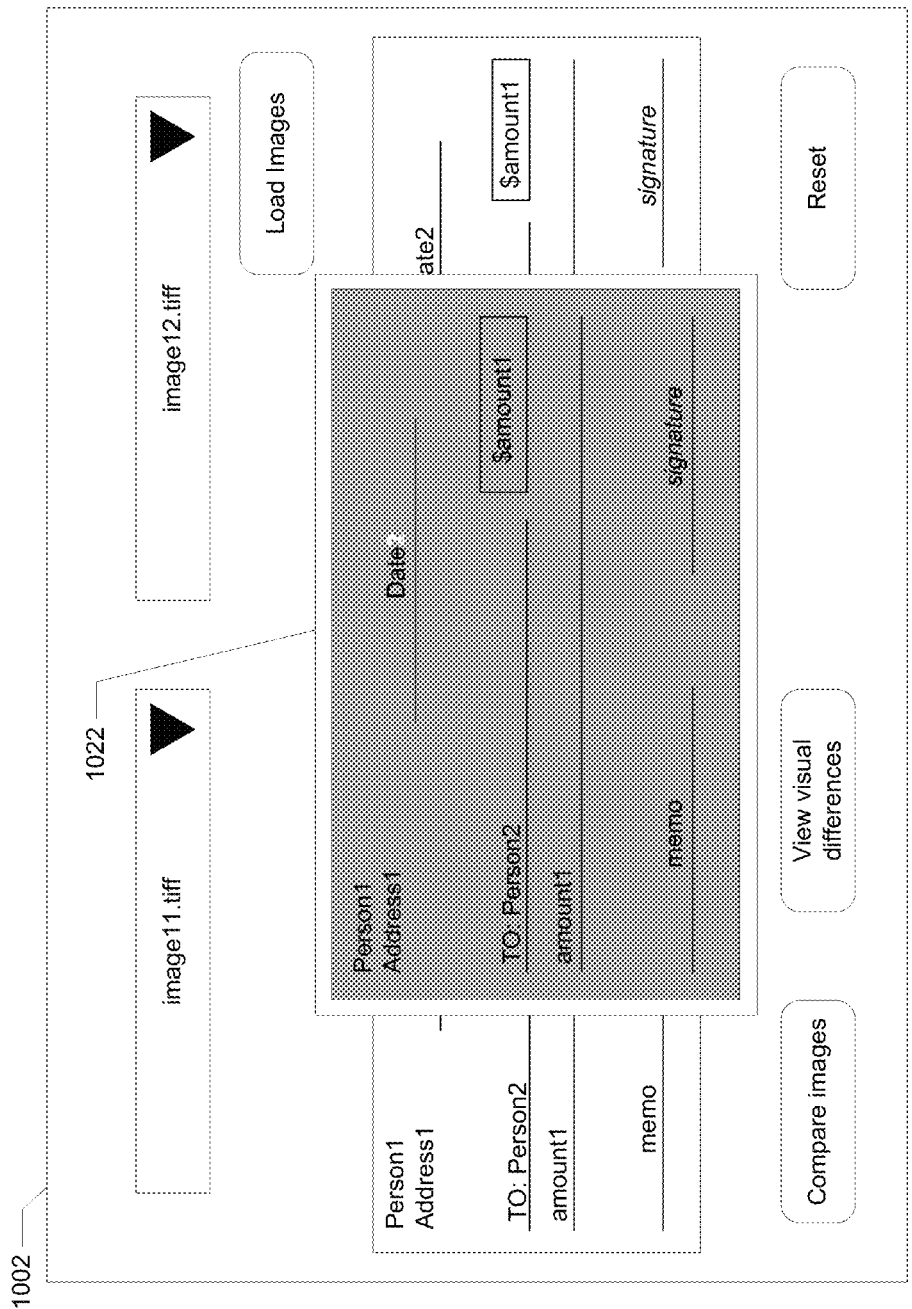

FIG. 10B depicts an illustrative graphical user interface that may be displayed corresponding to the visual differences process, based on the checks depicted in FIG. 10A. For example, if view visual differences button 1014 is selected from screen 1002 depicted in FIG. 10A, then image frame 1022 may be displayed, as depicted in FIG. 10B.

Specifically, image frame 1022 may visually display the differences between the two checks. Similarities between the checks may be drawn using low intensity or high opacity. Differences between the checks may be drawn using high intensity or low opacity. In the example depicted in FIG. 10B, the date of the checks is different (e.g., "Date1" vs. "Date2"). Therefore, the portion of the date that is different is drawn using high intensity or low opacity, while the portion of the date that is the same is drawn using low intensity or high opacity. Thus, the differences between multiple checks may be quickly identified based on a visual inspection of image frame 1022.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method comprising:
    receiving, by a computing device, a first image and a second image;
    determining, by the computing device, whether a size of the first image is different from a size of the second image;
    if the size of the first image is different from the size of the second image:
        identifying, by the computing device, a best fit size, based on the size of the first image and the size of the second image; and
        resizing, by the computing device, at least one of the first image and the second image to the best fit size;
    generating, by the computing device, an image frame;
    for each pixel of the first image and each pixel of the second image in a corresponding location as the pixel of the first image:
        comparing, by the computing device, the pixel of the first image with the pixel of the second image to determine if the pixel of the first image is the same as the pixel of the second image;
        in a case that the pixel of the first image is the same as the pixel of the second image, drawing, by the computing device, a pixel in the corresponding location on the image frame with low intensity; and
        in a case that the pixel of the first image is not the same as the pixel of the second image, drawing, by the computing device, the pixel in the corresponding location on the image frame with high intensity.

2. The method of claim 1, wherein the best fit size is a minimized size that is equal to or smaller in size to the size of the first image and the size of the second image.

3. The method of claim 1, comprising resizing the first image and the second image to the best fit size, and wherein identifying the best fit size comprises:
    determining, by the computing device, distortion of the first image after resizing;
    determining, by the computing device, distortion of the second image after resizing; and
    identifying, by the computing device, the best fit size based on minimizing the distortion of the first image after resizing and minimizing the distortion of the second image after resizing.

4. The method of claim 1, comprising resizing the first image and the second image to the best fit size, and wherein identifying the best fit size comprises:
    determining, by the computing device, skewness of the first image after resizing;
    determining, by the computing device, skewness of the second image after resizing; and
    identifying, by the computing device, the best fit size based on minimizing the skewness of the first image after resizing and minimizing the skewness of the second image after resizing.

5. The method of claim 1, wherein resizing at least one of the first image and the second image to the best fit size comprises resizing at least one of the first image and the second image using an anti-aliasing bias.

6. The method of claim 1, comprising:
    determining, by the computing device, the high intensity based on a complement of the low intensity,
    wherein drawing the pixel in the corresponding location on the image frame with the high intensity comprises drawing, by the computing device, the pixel in the corresponding location on the image frame with the high intensity based on the complement of the low intensity.

7. The method of claim 1, wherein drawing the pixel in the corresponding location on the image frame with low intensity comprises:
    altering, by the computing device, the pixel of the first image to have low intensity; and
    drawing, by the computing device, the pixel in the corresponding location on the image frame with low intensity using the altered pixel.

8. The method of claim 7, wherein drawing the pixel in the corresponding location on the image frame with high intensity comprises:
   determining, by the computing device, the high intensity based on a complement of the low intensity;
   altering, by the computing device, the pixel of the first image to have the high intensity based on the complement of the low intensity; and
   drawing, by the computing device, the pixel in the corresponding location on the image frame with the high intensity using the altered pixel.

9. The method of claim 8, comprising:
   after drawing each altered pixel of the first image on the image frame:
   for each pixel of the second image and each pixel of the first image in a corresponding location as the pixel of the second image:
      comparing, by the computing device, the pixel of the second image with the pixel of the first image to determine if the pixel of the second image is the same as the pixel of the first image;
      in a case that the pixel of the second image is the same as the pixel of the first image, drawing, by the computing device, a second pixel in the corresponding location on the image frame with low intensity; and
      in a case that the pixel of the second image is not the same as the pixel of the first image, drawing, by the computing device, the second pixel in the corresponding location on the image frame with high intensity.

10. The method of claim 9, wherein drawing the second pixel in the corresponding location comprises combining pixel data from the pixel in the corresponding location and the second pixel in the corresponding location to determine combined pixel data in the corresponding location, wherein the combined pixel data in the corresponding location is used for drawing a final pixel in the corresponding location.

11. The method of claim 1, comprising:
   determining, by the computing device, whether any pixels of the image frame are drawn with high intensity;
   if any pixels of the image frame are drawn with high intensity, determining, by the computing device, that the first image and the second image are not duplicates; and
   if no pixels of the image frame are drawn with high intensity, determining, by the computing device, that the first image and the second image are duplicates.

12. The method of claim 1, comprising:
   highlighting, by the computing device, a portion of the image frame that is drawn with high intensity.

13. The method of claim 12, comprising:
   generating, by the computing device, an enlarged view of the portion of the image frame that is drawn with high intensity; and
   receiving, by the computing device, input indicating whether the first image and the second image are duplicates.

14. The method of claim 13, comprising:
   based on the input indicating whether the first image and the second image are duplicates, tagging, by the computing device, the first image and the second image to indicate whether the first image and the second image are duplicates.

15. The method of claim 1, comprising:
   determining, by the computing device, a group of pixels within a threshold distance of each other and drawn with high intensity; and
   based on a number of pixels in the group of pixels within the threshold distance of each other and drawn with high intensity being greater than a threshold, determining, by the computing device, that the first image and the second image are not duplicates.

16. The method of claim 1, wherein optical character recognition is not performed on the first image and the second image before generating the image frame.

17. The method of claim 1, comprising:
   darkening, by the computing device, each pixel on the image frame drawn with low intensity; and
   brightening, by the computing device, each pixel on the image frame drawn with high intensity.

18. The method of claim 1, comprising:
   determining, by the computing device, that the first image has a first orientation;
   determining, by the computing device, that the second image has a second orientation different from the first orientation; and
   altering, by the computing device, one of the first image and the second image to have a same orientation.

19. Non-transitory computer-readable media storing executable instructions that, when executed by at least one processor, cause a system to:
   receive a first image and a second image;
   determine whether a size of the first image is different from a size of the second image;
   if the size of the first image is different from the size of the second image:
      identify a best fit size, based on the size of the first image and the size of the second image; and
      resize at least one of the first image and the second image to the best fit size;
   generate an image frame;
   for each pixel of the first image and each pixel of the second image in a corresponding location as the pixel of the first image:
      compare the pixel of the first image with the pixel of the second image to determine if the pixel of the first image is the same as the pixel of the second image;
      in a case that the pixel of the first image is the same as the pixel of the second image, draw a pixel in the corresponding location on the image frame with low intensity; and
      in a case that the pixel of the first image is not the same as the pixel of the second image, draw the pixel in the corresponding location on the image frame with high intensity.

20. A system comprising:
   at least one processor; and
   non-transitory memory storing executable instructions that, when executed by the at least one processor, cause the system to:
      receive a first image and a second image;
      determine whether a size of the first image is different from a size of the second image;
      if the size of the first image is different from the size of the second image:
         identify a best fit size, based on the size of the first image and the size of the second image; and
         resize at least one of the first image and the second image to the best fit size;
      generate an image frame;

for each pixel of the first image and each pixel of the second image in a corresponding location as the pixel of the first image:
  compare the pixel of the first image with the pixel of the second image to determine if the pixel of the first image is the same as the pixel of the second image;
  in a case that the pixel of the first image is the same as the pixel of the second image, draw a pixel in the corresponding location on the image frame with low intensity; and
  in a case that the pixel of the first image is not the same as the pixel of the second image, draw the pixel in the corresponding location on the image frame with high intensity.

* * * * *